United States Patent [19]
Osaki

[11] Patent Number: 5,242,189
[45] Date of Patent: Sep. 7, 1993

[54] WHEELED LUGGAGE CARRIER

[76] Inventor: Sam Osaki, 1468 Sheffield Dr., Campbell, Calif. 95008

[21] Appl. No.: 964,403

[22] Filed: Oct. 21, 1992

[51] Int. Cl.5 .................................................. B62B 1/12
[52] U.S. Cl. .................................. 280/645; 280/652; 280/655; 280/47.24; 280/47.315
[58] Field of Search ................ 280/639, 37, 652, 654, 280/47.17, 47.18, 47.24, 47.371, 47.315, 645

[56] References Cited
U.S. PATENT DOCUMENTS
2,449,910  9/1948  Quiring ............................. 280/652

FOREIGN PATENT DOCUMENTS
1005665  4/1952  France ............................. 280/652
1069422  5/1967  United Kingdom ............. 280/652

Primary Examiner—Richard M. Camby
Attorney, Agent, or Firm—Jeffrey A. Hall

[57] ABSTRACT

A wheeled and foldable luggage carrier comprising a handle assembly slideably coupled to a luggage support surface, a support frame, and an axle assembly. The handle assembly includes a handle, a handle extension, and a longitudinal handle extension slideably connected to tubular members of the support surface, a detachable luggage retaining frame having longitudinal and transverse members is detachably secured to the luggage support surface. A support frame includes a pair of upright support members hingedly secured to a pair of lower upright support members, a pair of diagonal tubular members hingedly coupled to a pair of extension members, and a foldable brace member secured to the termini of the pair of extension members. The foldable brace member includes a locking junction member for locking, folding, and positioning the foldable brace member. An axle assembly is secured to the termini of the foldable brace member and includes a pivot joint, a flange, and a wheel shaft operably coupled to a pair of wheels.

15 Claims, 4 Drawing Sheets

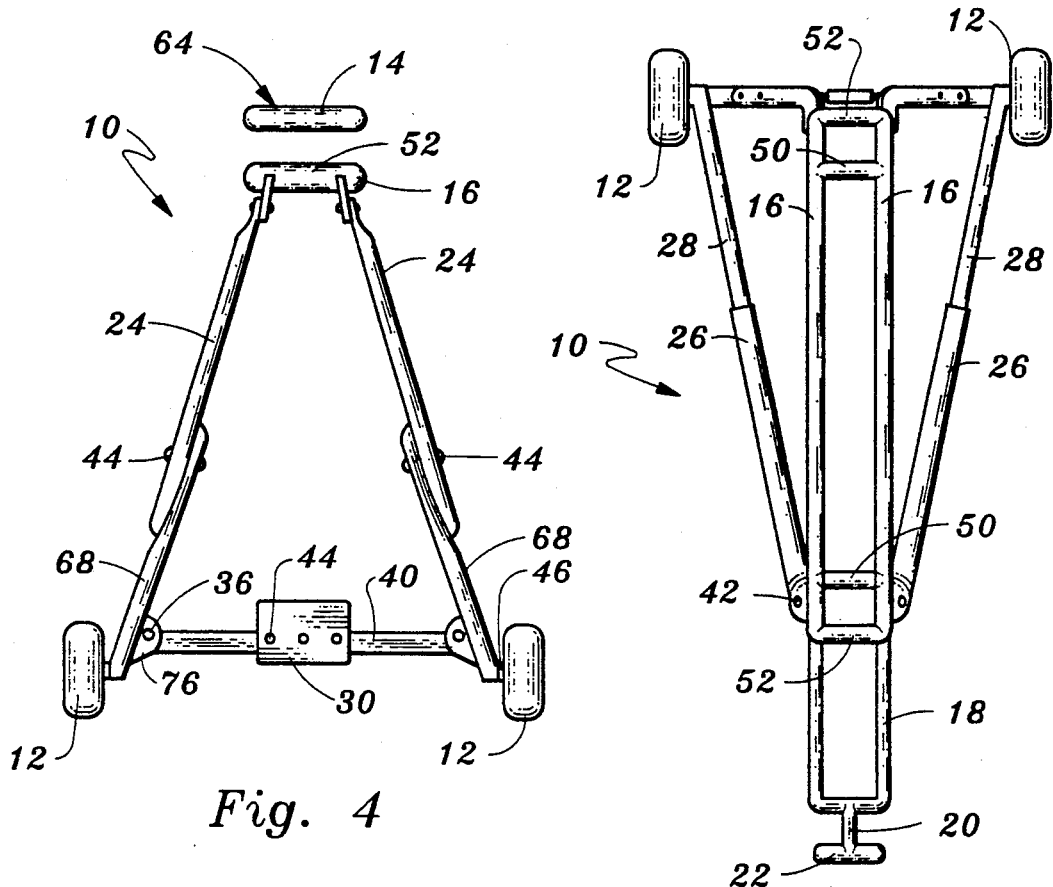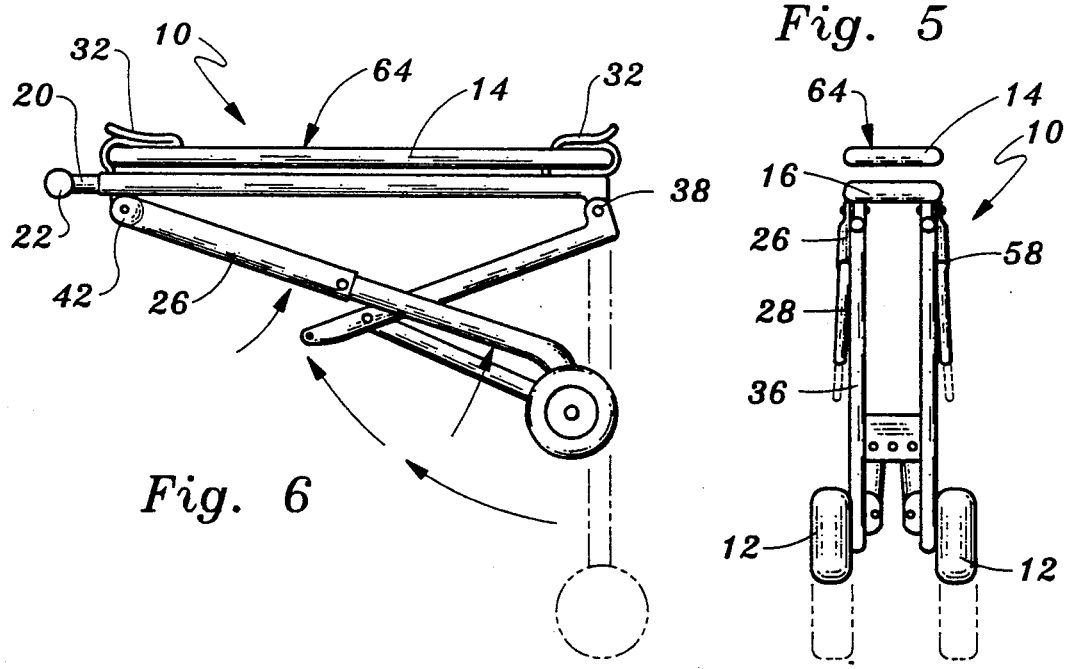

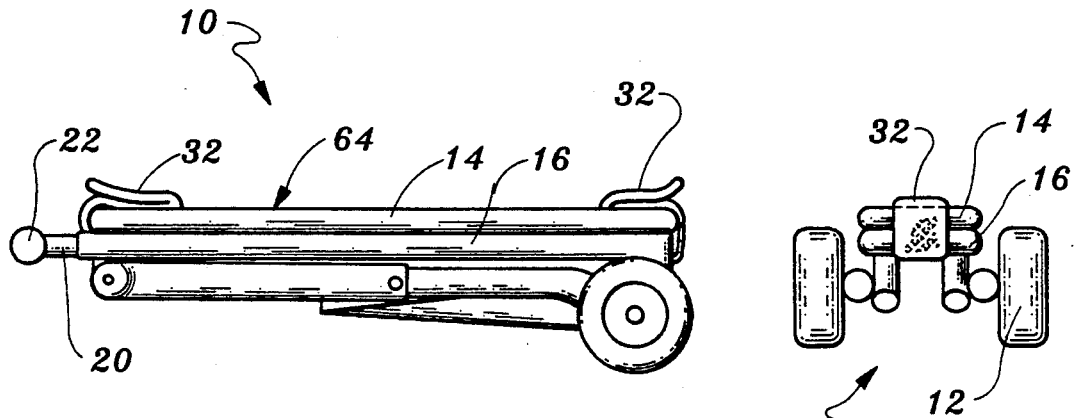
Fig. 8
Fig. 9
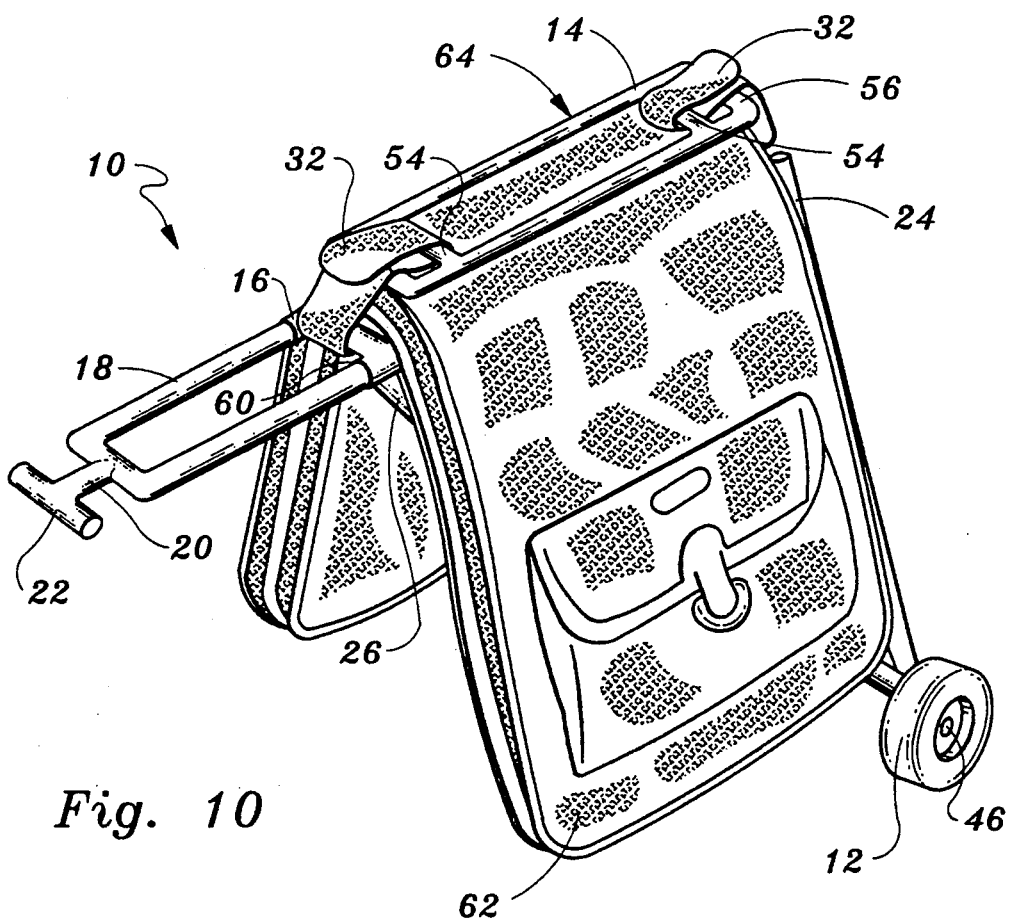
Fig. 10

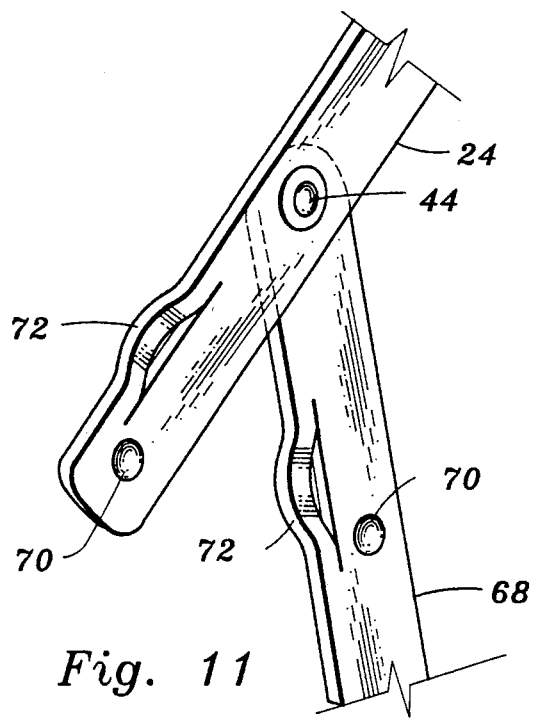
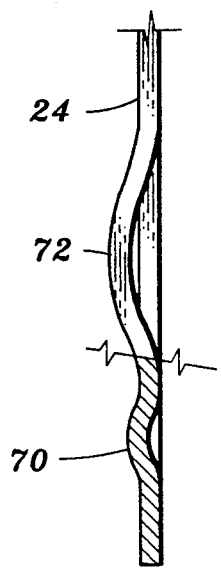
Fig. 11
Fig. 14
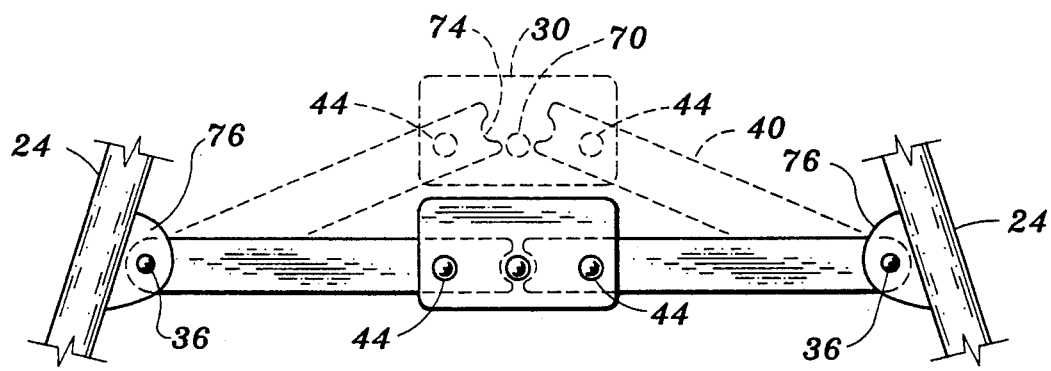
Fig. 12
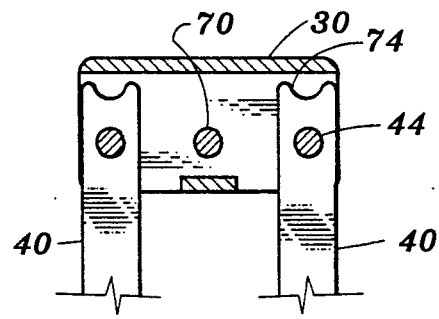
Fig. 13

WHEELED LUGGAGE CARRIER

BACKGROUND OF THE INVENTION

1. Field of Invention

The present invention relates to wheeled hand-held luggage carriers of the type commonly employed by airplane passengers. In particular, the present invention relates to multipurpose, wheeled luggage carriers capable of transporting suitcases, bags, self-supporting garment bags, and the like.

2. Description of Prior Art

At the present time there are many conventional means of transporting luggage. The traveler has the choice of hand-held luggage such as suitcases, "carry-on" bags, garment bags, and an assortment of carrier apparatuses. Suitcases are suitable for carrying many articles, however, a suitcase must be checked, in most cases, and cannot be carried onto an aircraft or stored in overhead compartments. A packed suitcase is also both heavy and cumbersome and unsuitable for transport over large distances. Numerous wheel and handle arrangements have been added to suitcases to facilitate transport, however, they are still unsuitable as "carry-ons". Moreover, the suitcase is somewhat unsatisfactory for the business traveler who typically has only a few days of clothes to carry and would prefer not to be delayed waiting for luggage to be unloaded from the airplane. A partial solution to this problem is the lightweight carry on bags which permit some flexibility in transporting clothes yet do not provide convenient means for carrying or transport. Another problem with carry on bags is that, when used with other luggage they must be carried separately, and require some positioning and re-positioning of the luggage whenever use of the hands is required.

Another partial solution to carrying certain luggage is the garment bag. However, garment bags are usually cumbersome and bulky, and somewhat awkward to carry. When smaller items are carried in a garment bag they fall to the bottom of the bag resulting in disorder of if spillage, damage to articles carried thereon. Numerous attempts have been made to make the garment bag more like a large suitcase, unfortunately such attempts have resulted in large rigid pieces of luggage which are difficult to carry and store. An example of this genre is U.S. Pat. No. 4,030,768 issued to Lugash which discloses a rigid, mobile bag capable of carrying long pieces of clothing without folding. However, this type of bag only adds to a travelers problems when attempts are made to transport the bag in conjunction with other luggage such as suitcases.

Various carriers have been proposed and implemented for use with garment bags. Representative examples are U.S. Pat. No. 4,383,141 issued to Walker which discloses a carrier for garment bags with a peripheral frame member for insertion into the garment bag; U.S. Pat. No. 4,062,429 issued to Taber et al. which discloses a carrier having an axial post and extendable leg members which allow the device to be stable in an upright, standing position; and U.S. Pat. No. 4,538,709 issued to Williams et al. which discloses a wheeled garment bag having a garment enclosure and spring loaded support feet reflected in the "AIRPORTER" and "SKYVALET" commercial designs.

None of the prior art known to applicant discloses a wheeled luggage carrier for carrying luggage and garment bag which can be easily attached, unfolded to transport said luggage or garment bag as required, then folded into a compact configuration for convenient transport onto aircraft and stored in overhead compartments either attached or separate from luggage or garment bags.

SUMMARY OF THE INVENTION

The present invention provides a wheeled luggage carrier which is foldable in a manner which facilitates use by travelers irrespective of their mode of travel. The present invention, in one preferred embodiment, comprises a foldable, wheeled luggage carrier having a handle assembly slideably coupled to a pair of tubular members, said tubular members have a pair of transverse members secured thereto and a pair of end transverse members having luggage fastening means secured thereto.

A luggage retaining frame including a pair of longitudinal members are connected by a pair of transverse elements and are detachably secured to the support surface by the luggage fastening means, which in a preferred embodiment are straps having hook and loop fastening means on the ends thereof.

A support frame comprises a pair of upper upright tubular members hingedly secured to a pair of lower upright support members with the upper upright support members preferably hingedly secured to the pair of transverse members of the support surface. A pair of diagonal tubular members are preferably hingedly secured to a pair of extension members and to the pair of transverse members substantially in proximity to the longitudinal handle extension. A foldable brace member is secured to the termini of the pair of extension members and includes a locking junction member for folding, positioning, and securing the foldable brace member. An axle assembly is operably secured to the foldable brace member and includes a pivot joint, flange, and a wheel shaft coupled to a pair of wheels and to the foldable brace member.

In accordance with the purposes of thee invention, there is also provided a wheeled luggage carrier, comprising: a handle assembly, a luggage support surface slideably connected to said handle assembly, said luggage support surface comprising a pair of tubular members transversely connected by a pair of transverse members and a pair of end transverse members having luggage fastening means secured thereto, a detachable luggage retaining frame comprising a pair of longitudinal members having a pair of transverse elements attached thereto, said detachable luggage retaining frame is secured to said luggage support surface by said luggage fastening means, a support frame comprising a pair of upper upright support members hingedly secured to a pair of lower upright support members, said pair of upper upright support members are hingedly secured to said pair of transverse members of said luggage support surface; a pair of diagonal tubular members are hingedly coupled to a pair of extension members, said pair of diagonal tubular members are hingedly secured to said pair of transverse members of said luggage support surface; a foldable brace member is secured to the termini of said pair of extension members and said pair of lower upright support members, said foldable brace member includes a locking junction member for positioning the foldable brace member, and an axle assembly secured to the termini of the foldable brace member includes a wheel shaft coupled to a pivot joint and to a pair of wheels.

BRIEF DESCRIPTION OF THE DRAWINGS

The accompanying drawings, which are incorporated in and constitute a part of the specification, illustrate a preferred embodiment of the invention and, together with a general description given above and the detailed description of the preferred embodiment given below, serve to explain the principles of the invention.

FIG. 4 shows a rear orthographic view of such luggage carrier.

FIG. 5 shows a top orthographic view of such luggage carrier with luggage retainer frame 64 removed.

FIG. 6 shows a side view of such luggage carrier in a partially folded position.

FIG. 7 shows a rear view of such luggage carrier in a partially folded configuration.

FIG. 8 shows a side view of such luggage carrier in a fully folded configuration.

FIG. 9 shows a rear view of such luggage carrier in a fully folded configuration.

FIG. 10 shows an upper right perspective view of such luggage carrier with a garment bag 62 attached to tubular member 16.

FIG. 11 shows a view of hinged locking joint 58 for upper and lower upright support members 24 and 68, according to the invention.

FIG. 12 shows a view of locking junction member 30 attached to lower upright support member 68, according to the invention.

FIG. 13 shows a view of locking junction member 30 in an unlocked position, according to the invention.

FIG. 14 shows a front view of upper upright support member 24 locking mechanism with dimple 70 and notch 74, according to the invention.

DETAILED DESCRIPTION OF THE PREFERRED EMBODIMENTS

Reference will now be made in detail to the present preferred embodiments of the invention as illustrated in the accompanying drawings.

In accordance with the present invention, there is provided a wheeled luggage carrier which is foldable, comprising: a handle assembly slideably coupled to a pair of tubular members, said tubular members having a pair of transverse members forming a support surface and a pair of end transverse members having luggage fastening means secured thereto, a luggage retaining frame comprising a pair of longitudinal members connected by a pair of transverse elements and detachably secured to said support surface by said luggage fastening means, a support frame comprising a pair of upper upright tubular members hingedly secured to a pair of lower upright support members, said pair of upper upright support members are hingedly secured to said pair of transverse members; a pair of diagonal tubular members hingedly secured to a pair of extension members, said pair of diagonal tubular members are hingedly coupled to said pair of transverse members substantially in proximity to said handle assembly; a foldable brace member secured to the termini of said pair of extension members including a locking junction member for positioning said foldable brace member, and an axle assembly secured to the termini of the foldable brace member.

Figure 1:
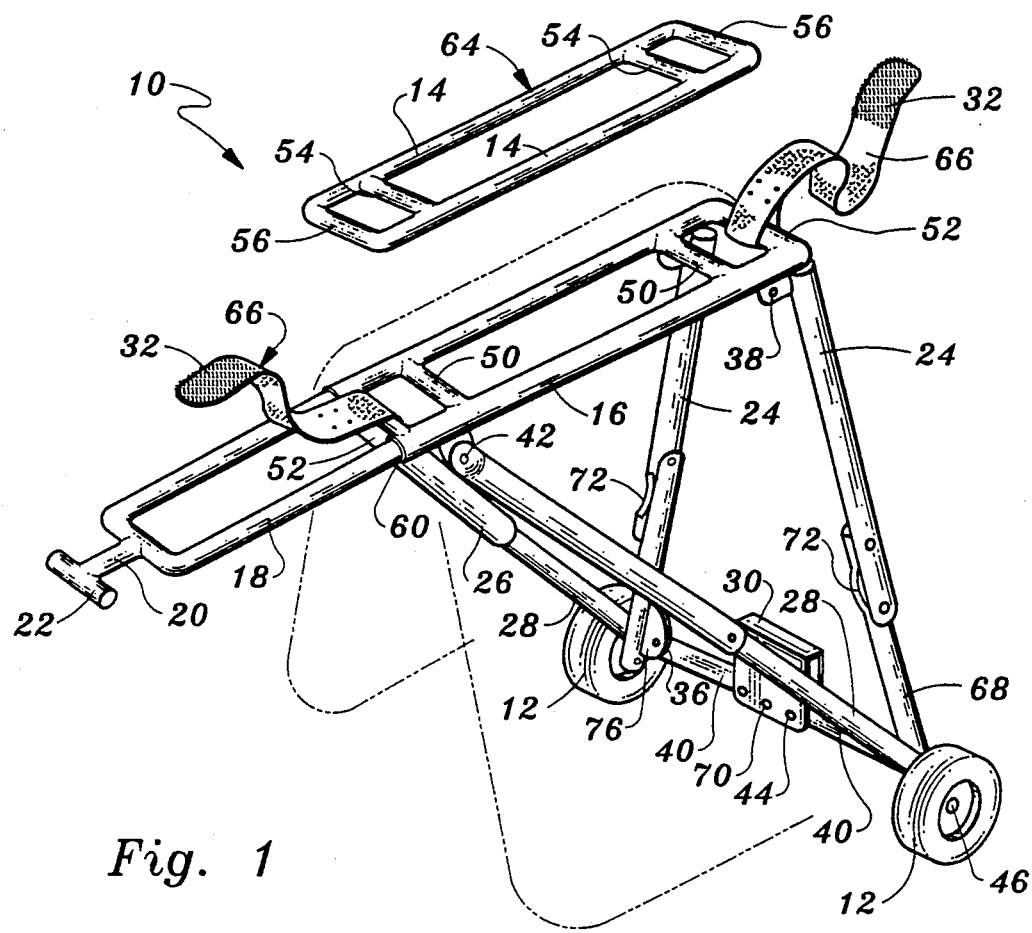
FIG. 1 shows a front perspective view of a wheeled luggage carrier showing a partially removed luggage retainer frame 64 and opened fastening straps 32 with handle 22 in a fully extended position, according to the invention.

In FIG. 1 the foldable wheeled luggage carrier 10 is shown having a handle assembly comprising a handle 22, a handle extension 20 and a longitudinal handle extension 18 slideably coupled to a pair of tubular members 16. Preferably the tubular members 16 have a pair of transverse members 50 forming a support surface, and transverse members 52 with luggage fastening means secured thereto. In the preferred embodiment luggage fastening means comprise straps 66 having hook and loop fasteners 32 thereon. Hook and loop fasteners 32, however, may be replaced with other conventional attachment means such as buckles, snaps, or the like. Longitudinal handle extension 18 may be extended to varying lengths by pulling it out of or pushing it into aperture 60 in tubular members 16. Locking means such as a conventional button lock device may be provided in member 16 to secure longitudinal handle extension 18 at desired lengths.

A luggage retaining frame, best seen in FIGS. 1-4 comprises a pair of longitudinal members 14 connected by a pair of transverse elements 54, and is detachably secured to tubular members 16 and transverse members 50 forming the support surface by the luggage fastening means, preferably straps 66.

A support frame, best seen in FIG. 1, comprises a pair of upright support members 24 hingedly secured to a pair of lower upright support members 68. The pair of upper upright support members 24 are hingedly secured to said pair of transverse members 50 at pivot joint 38 allowing tubular members 24 to be folded up against tubular members 16. A pair of diagonal tubular members 26 are hingedly secured to a pair of extension members 28 and the pair of diagonal tubular members 26 are hingedly coupled to said pair of transverse members 50 at pivot joint 42, which is positioned in substantial proximity to the handle assembly, preferably on tubular members 16 near transverse member 50 as shown in FIG. 1.

A foldable brace member 40 is secured to the termini of said pair of extension members 28 and said pair of lower upright support members 68. Foldable brace member 40 preferably is jointed and includes a locking junction member 30 with pivot joint 44 and dimple 70 best seen in FIGS. 12 and 13. Foldable brace member 40 includes notches 74 to slideably lock with dimple 70 providing for folding and unfolding of foldable brace member 40. A wheel assembly, comprising wheels 12, wheel shaft 46, pivot joint 36 and flange 76 is secured to the termini of the foldable brace member 40 allowing for wheeled movement of luggage carrier 10. Lower support members 68 are preferably hingedly secured to foldable brace member 40 and pivot joint 36. Extension members 28 are preferably hingedly connected to the termini of foldable brace member 40, and are best seen in FIGS. 1 and 5.

Figures 2, 3:
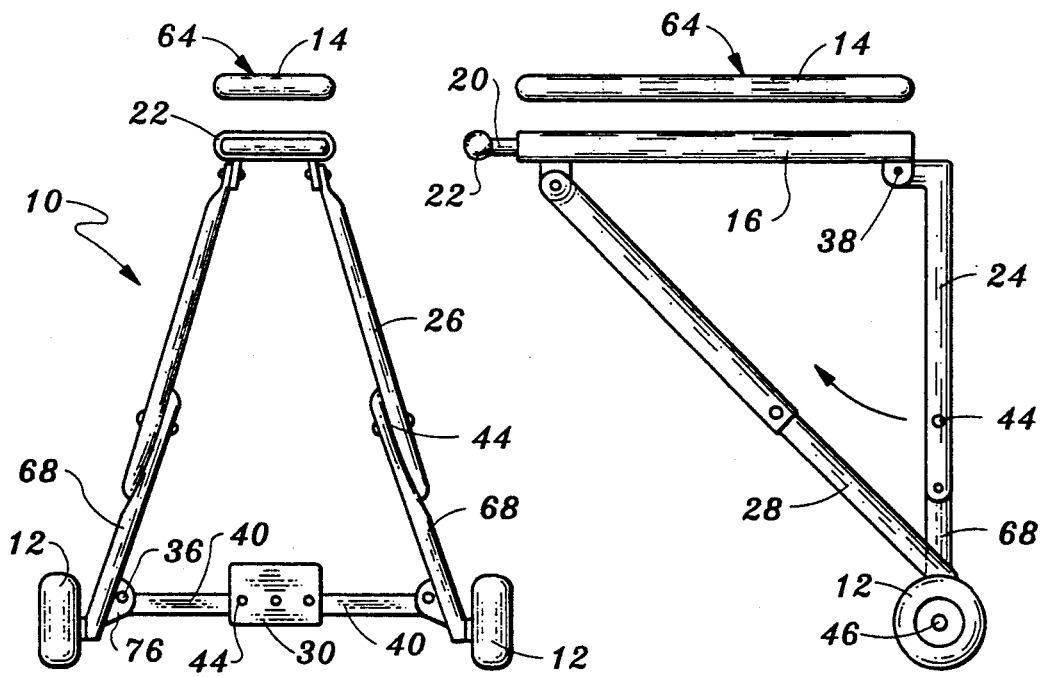
FIG. 2 shows a front view of such luggage carrier.
FIG. 3 shows a front right side view of such luggage carrier.

As shown in FIG. 2, pivot joints 36, 38, and 44 allow for the pivoting and hinged movement of upper and lower upright support members 24 and 68, tubular extension members 26, and extension member 28, and the folding or collapsibility of folding brace member 40. Hinged locking joint 58 hingedly joining upper upright support member 24 and lower upright support member 68 is also illustrated as are fenders 78 for wheels 12, which may optionally be provided.

Referring now to FIG. 3 a side view of the wheeled luggage carrier is shown with detachable luggage retaining frame 64 in a detached position and tubular diagonal member 26 and extension member 28 in an extended and locked position. Pivot joint 38 retains upper upright support member 24 in a locked position with pivot joint 44 locking lower upright support member 68 in a locked position. FIG. 4 shows wheeled luggage carrier 10 in a rear orthographic view as in FIG. 3.

As shown in FIG. 5 which is a top orthographic view of the wheeled luggage carrier 10, handle 22 is preferably transversely positioned in relation to handle extension 20. Longitudinal handle extension 18 is shown pulled out of tubular member 16, and in this view, retainer frame 64 is removed from luggage carrier 10. As is readily seen in this view, luggage carrier 10 is very streamlined and simple in construction, while providing ample surface area for carrying a wide variety of luggage types, such as garment bags, briefcases, suitcases, bags, and the like.

Wheeled luggage carrier 10 is easily folded to a compact configuration. As seen in FIG. 6 luggage carrier 10 is shown in a partially folded position with upper tubular support member 24 pivoting on pivot joint 38 and swinging lower upright support member 68, wheel 12, tubular diagonal support 26, and extension member 28 towards the support surface and retainer frame 64. Note in this view that longitudinal handle extension member 18 is pushed into tubular member 16, however, this is not necessary for folding 10. FIG. 7 shows a rear view of luggage carrier 10 in a partially folded position as in FIG. 6.

Referring now to FIG. 8 luggage carrier 10 is shown in a fully folded position with longitudinal handle extension 18 pushed together with tubular member 16. Wheels 12, retainer frame 64, tubular members 16, and the support frame fold conveniently and easily together when not in use. This is also the folded configuration of luggage carrier 10 while it is still attached to a garment bag which eliminates carrying the carrier separately and thereby facilitating easy storage of the garment bag and carrier in overhead aircraft compartments as a single unit. FIG. 9 shows a rear view of luggage carrier 10 in a fully folded configuration as in FIG. 8.

In operation and use wheeled luggage carrier 10 is easy and convenient to transport, store, and use. FIG. 10 shows luggage carrier 10 with a garment bag 62 secured by means of strap 66 across tubular members 16 via retaining frame 64. Luggage carrier 10 also conveniently and easily carries and transports suitcases, bags, briefcases, and the like. To remove an article from luggage carrier 10, the hook and loop fasteners 32 are separated and straps 66 removed from retaining frame 64 so that retaining frame 64 may be lifted away from tubular members 16, and the article, such as garment bag 62, is then removed.

Referring now to FIG. 11, a preferred hinged locking joint 58 for the upper upright support member 24 and lower upright support member 68 is shown. An offset elevation 72 is matched with a corresponding dimple 70 allowing for hinged locking and unlocking of members 24 and 68 around pivot point 44. FIG. 14 shows a side view of this preferred locking and unlocking mechanism on upper upright support member 24, with offset elevation 72, and dimple 70 appearing as raised elevations in this view.

As seen in FIGS. 12 and 13, a preferred configuration of locking junction member 30 on foldable brace member 40 is illustrated. Locking junction member 30 is operably coupled with pivots joints 44, dimples 70 on locking junction member 30 and paired notches 74 on foldable brace member 40. Foldable brace member 40 is, in this embodiment separated in the middle to form two corresponding halves hingedly connected by locking junction member 30 and pivot joint 44. FIG. 12 show locking junction member 30 and foldable brace member 40 in a locked position being moved to a folded or unlocked position. FIG. 13 shows locking junction member 30 in an unlocked position with dimples 70 and locking junction member 30 disengaged from notches 74 on foldable brace member 40.

While the above description contains many specificities these should not be construed as limitations on the scope of the invention, but merely as exemplifications of preferred embodiments thereof. Additional advantages and modifications will readily occur to those skilled in the art. The invention in its broader aspects is, therefore, not limited to the specific details, representative apparatus and illustrative examples shown and described. Accordingly, departures may be made from such details without departing from the spirit of the invention.

I claim:

1. A foldable wheeled luggage carrier, comprising:
   a handle assembly slideably coupled to a pair of tubular members, said tubular members having a pair of transverse members forming a support surface and a pair of end transverse members having luggage fastening means secured thereto.
   a luggage retaining frame comprising a pair of longitudinal members connected by a pair of transverse members and detachably secured to said support surface by said luggage fastening means.
   a support frame comprising a pair of upper upright support members hingedly secured to a pair of lower upright support members, said pair of upper upright support members are hingedly secured to said handle assembly at one member of said pair of transverse members; a pair of diagonal tubular members hingedly secured to a pair of extension members, said pair of diagonal tubular members are hingedly coupled to said handle assembly at one member of said pair of transverse members substantially in proximity to said longitudinal handle extension; a foldable brace member secured to the termini of said pair of extension members including a locking junction member for positioning said foldable brace member, and
   an axle assembly secured to the termini of the foldable brace member.

2. The luggage carrier of claim 1 wherein said handle assembly includes a handle, a handle extension, and a longitudinal handle extension having a pair of longitudinal members slideably connected to said pair of tubular members.

3. The luggage carrier of claim 1 wherein said luggage fastening means comprise a pair of straps each respectively secured to one of said pair of end transverse members.

4. The luggage carrier of claim 1 wherein said pair of upper upright support members are hingedly secured to said handle assembly at one member of said pair of transverse members pair at a pivot joint.

5. The luggage carrier of claim 1 wherein said pair of diagonal tubular members are hingedly secured to said pair of transverse members at a pivot joint.

6. The luggage carrier of claim 1 wherein said pair of lower upright support members are hingedly secured to said foldable brace at a pivot point.

7. The luggage carrier of claim 1 wherein said pair of extension members are hingedly connected to the termini of said foldable brace member.

8. The luggage carrier of claim 1 wherein said axle assembly includes a pivot joint, a flange, and a wheel shaft operably coupled to a pair of wheels and to said foldable brace member.

9. A wheeled luggage carrier, comprising:
a handle assembly,
a luggage support surface slideably connected to said handle assembly, said luggage support surface comprising a pair of tubular members transversely connected by a pair of transverse members and a pair of end transverse members having luggage fastening means secured thereto.
a detachable luggage retaining frame comprising a pair of longitudinal members having a pair of transverse members attached thereto, said detachable luggage retaining frame is secured to said luggage support surface by said luggage fastening means,
a support frame comprising a pair of upper upright support members hingedly secured to a pair of lower upright support members, said pair of upper upright support members are hingedly secured to said pair of transverse members of said luggage support surface; a pair of diagonal tubular members are hingedly coupled to a pair of extension members, said pair of diagonal tubular members are hingedly secured to said handle assembly at one member of said pair of transverse members in proximity to said longitudinal handle extension; a foldable brace member is secured to the termini of said pair of extension members and said pair of lower upright support members, said foldable brace member includes a locking junction member for positioning the foldable brace member, and
an axle assembly to the termini of the foldable brace including a wheel shaft coupled to a pivot joint and to a pair of wheels.

10. The luggage carrier of claim 9 wherein said handle assembly comprises a handle, a handle extension, and a longitudinal handle extension including a pair of longitudinal members slideably connected to said pair of tubular members.

11. The luggage carrier of claim 9 wherein said luggage fastening means comprises a pair of straps each respectively secured to one of said pair of end transverse members.

12. The luggage carrier of claim 9 wherein said pair of diagonal tubular members are hingedly coupled to said handle assembly at one member of said pair of transverse members at a pivot joint.

13. The luggage carrier of claim 9 wherein said pair of lower upright support members are hingedly secured to said foldable brace at a pivot joint.

14. The luggage carrier of claim 9 wherein said pair of extension members are hingedly connected to the termini of said foldable brace.

15. The luggage carrier of claim 9 wherein said lower upright support members and said upper tubular upright support members each include a dimple and an offset raised portion thereon allowing hinged locking of the lower upright support members to the upper tubular upright support members.

* * * * *